(12) United States Patent
Leboff

(10) Patent No.: US 8,943,885 B2
(45) Date of Patent: Feb. 3, 2015

(54) SYSTEM THAT MEASURES AND REPORTS LOCAL WIND CONDITIONS

(71) Applicant: Jay Leboff, Bedford, NY (US)

(72) Inventor: Jay Leboff, Bedford, NY (US)

( * ) Notice: Subject to any disclaimer, the term of this patent is extended or adjusted under 35 U.S.C. 154(b) by 0 days.

(21) Appl. No.: 13/849,768

(22) Filed: Mar. 25, 2013

(65) Prior Publication Data

US 2014/0283594 A1 Sep. 25, 2014

(51) Int. Cl.
*G01W 1/00* (2006.01)
*G01W 1/02* (2006.01)

(52) U.S. Cl.
CPC .. *G01W 1/00* (2013.01); *G01W 1/02* (2013.01)
USPC ...................................................... 73/170.16

(58) Field of Classification Search
CPC ..................................... G01L 1/00; G01L 1/02
USPC .......................................... 73/170.01–170.16
See application file for complete search history.

(56) References Cited

U.S. PATENT DOCUMENTS

| | | | |
|---|---|---|---|
| 2,836,064 A | 5/1958 | York | 73/170.09 |
| 3,641,815 A | 2/1972 | Fassett, II | 73/170.03 |
| 3,654,807 A | 4/1972 | Deskey | 73/180 |
| 3,665,759 A | 5/1972 | Daley | 73/170.09 |
| 3,763,703 A | 10/1973 | Man | 73/182 |
| 3,791,211 A | 2/1974 | Dobesch | 73/170.03 |
| 3,824,575 A | 7/1974 | Rich, III | 340/241 |
| 3,857,353 A | 12/1974 | Mounce | 114/144 C |
| 3,934,129 A | 1/1976 | Taylor et al. | 235/151.34 |
| 3,943,129 A | 3/1976 | Burges | 260/243 C |
| 4,043,194 A * | 8/1977 | Tanner | 73/178 T |
| 4,122,710 A | 10/1978 | Meller | 73/178 R |
| 4,137,764 A * | 2/1979 | Hallock et al. | 73/178 T |
| 5,477,424 A | 12/1995 | Mocha | 362/32 |
| 5,877,415 A | 3/1999 | Kruse | 73/170.03 |
| 7,305,876 B2 * | 12/2007 | Gillette | 73/170.16 |
| 7,347,091 B2 * | 3/2008 | Gillette | 73/170.16 |
| 7,385,304 B1 * | 6/2008 | Wohlert | 290/55 |
| 7,415,935 B2 | 8/2008 | Witte | 114/102.1 |
| 7,516,657 B2 | 4/2009 | Fan | 73/170.01 |
| 7,536,906 B2 | 5/2009 | Burke | 73/170.03 |
| 7,889,071 B2 * | 2/2011 | Theimer et al. | 340/539.13 |
| 8,237,559 B2 * | 8/2012 | Theimer et al. | 340/539.13 |
| 2007/0213934 A1 * | 9/2007 | Reed | 702/2 |
| 2010/0195089 A1 * | 8/2010 | Wu et al. | 356/28.5 |

FOREIGN PATENT DOCUMENTS

| | | |
|---|---|---|
| GB | 2225303 | 5/1990 |
| WO | WO 2009/066013 | 5/2009 |

* cited by examiner

*Primary Examiner* — Andre Allen
(74) *Attorney, Agent, or Firm* — Ostrolenk Faber LLP

(57) ABSTRACT

A system configured for measuring and displaying air pressure or air speed at a given location, the system including a sensor module and a display module that receives sensor readings from the sensor module for display in human perceptible form.

15 Claims, 3 Drawing Sheets

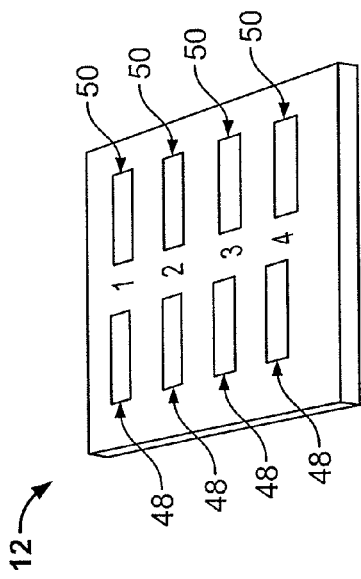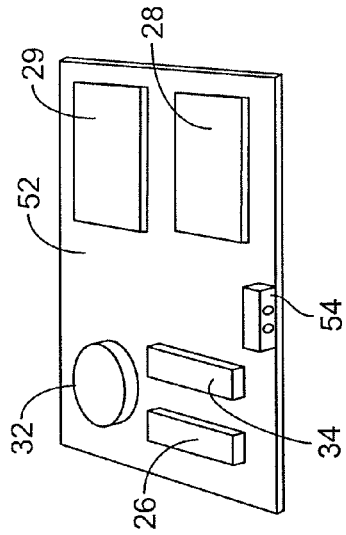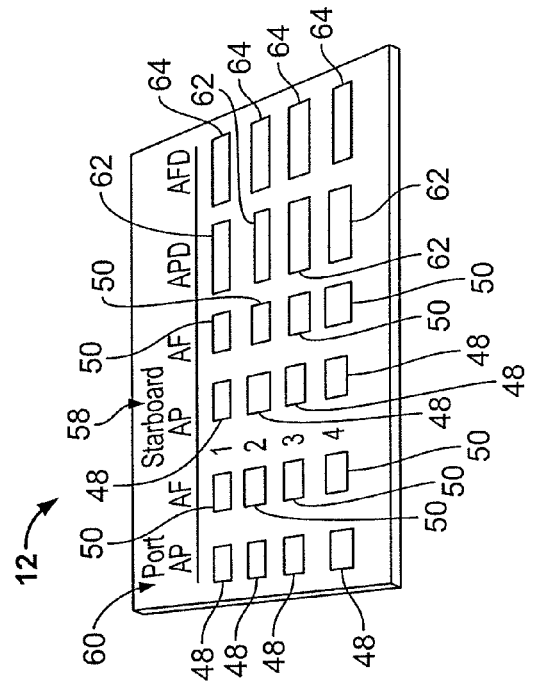

SYSTEM THAT MEASURES AND REPORTS LOCAL WIND CONDITIONS

FIELD OF THE INVENTION

The present application relates to a system for measuring wind conditions at a given location, and more particularly to a system that can measure air pressure and air speed at a given location.

BACKGROUND OF THE INVENTION

Knowledge of wind conditions at a given location is desirable in many applications. Taking sailing as an example, generally speaking, sailing is the art of using wind to control the motion of a vessel on a body of water. Among the factors that affect sailing is the sail and its interaction with the wind.

A sail functions as a foil with properties similar to the wing of an aircraft. It is well known that air moves faster where the wind strikes the sail. Faster moving air induces lower pressure on the sail. Conversely, slower moving air produces more pressure on the sail.

As is well known from the Bernoulli principle the difference in pressure will cause movement from a region of high pressure to a region of low pressure. Thus, the difference in the pressure on opposing sides of a sail induces the movement of the sail boat.

It is known that a sail boat cannot be induced to move if it is headed directly into the wind. However, it can, with the help of its keel, move upwind. Whether a sail will act as a foil to propel the vessel depends on the direction of the wind relative to the sail and the consequent pressure differential (speed differential) created to induce movement.

SUMMARY OF THE INVENTION

An object of the invention is a system that can acquire local wind conditions, such as air speed or air pressure. Another more specific object of the present invention is a system that can enable the proper positioning of the sail to maximize the propelling effects of the wind.

A system according to the present invention allows for the collection and the reporting of local wind conditions and includes a sensor module with at least one sensor device and a transmitter that transmits sensor readings based on the output of said sensor device, and a display module that reports, in a human perceptible form, wind conditions at the location of said sensor module based on said sensor readings, wherein said at least one sensor device is either an air flow sensor or an air pressure sensor.

In one embodiment, the sensor module may include an air pressure sensor and an air flow sensor.

In another embodiment, the system may include two sensor modules each providing sensor readings to the display module. Each sensor may include a pressure sensor, an air flow sensor, or both.

A sensor module in any of the embodiments of the present invention may include a housing having a top, said at least on sensor device extending from an interior of said housing to an exterior of said housing through an opening defined in said top. A photovoltaic converter may be provided on a exterior surface of the housing to serve as a source of power for the sensor module.

According to one aspect of the present invention, in a system according to the present invention, the sensor module (s) and the display module are configured to be wirelessly connected. Thus, at the very least sensor readings from the sensor module(s) are wirelessly sent to and received by the display module.

In one configuration, the display driver includes a microprocessor that is programmed to interpret the sensor readings received from the sensor module(s), and to control a display driver that operates a display device to display the readings from the sensor module(s) in a human perceptible form. Thus, for example, the microprocessor is programmed so that the air pressure readings and/or air flow readings are reported in the proper units for the user.

Optionally, in a configuration that employs more than one sensor module, the microprocessor may be programmed to calculate the differences in the sensor readings and to control the display driver to report those differences.

Other features and advantages of the present invention will become apparent from the following description of the invention, which refers to the accompanying drawings.

BRIEF DESCRIPTION OF THE DRAWINGS

FIG. 3A illustrates a top perspective view of a display module in a system according to the first embodiment of the present invention.

FIG. 3B illustrates a top perspective view of components of a display module supported by a common circuit board.

FIG. 3C illustrates placement of two sensor modules in a system according to the present invention on opposite sides of a main sail.

FIG. 3D illustrates a display module in a system according to the second embodiment of the present invention.

DETAILED DESCRIPTION

Figure 1:
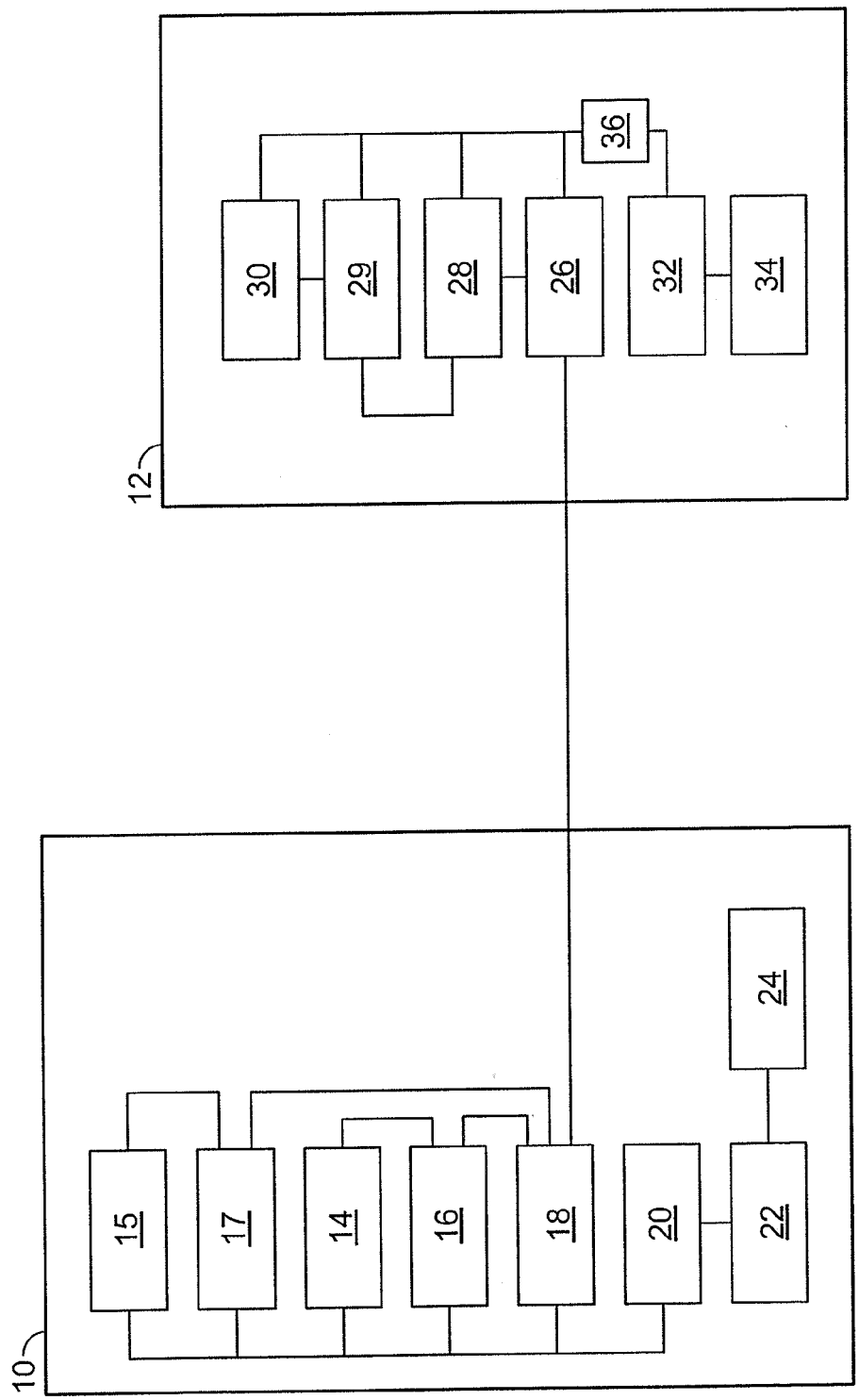
FIG. 1 schematically illustrates a system according to the present invention.

Referring to FIG. 1, a system according to the present invention includes a sensor module 10 and a display module 12. Sensor module 10 and display module 12 are preferably packaged separately and are configured to be in wireless communication when in an ON state.

Specifically, at the very least, sensor module 10 is configured to send data to display module 12 wirelessly and display module 12 is configured to receive data from sensor module 10 wirelessly.

Sensor module 10 includes an air pressure sensor device 14 in communication with an air pressure sensor circuit 16. Air pressure sensor circuit 16 receives the output of air pressure sensor device 14 and, after any necessary formatting, relays the output of air pressure sensor device 14 to wireless transmitter 18.

As disclosed herein formatting refers to application of any necessary conversion process to render the output of sensor device 14 suitable for transmission by transmitter 18. For example, output of sensor device 14 may be converted from analog to digital code (i.e. encoded) before transmission by transmitter 18.

Sensor module 10 also includes an air flow sensor device 15 in communication with an air flow sensor circuit 17. Air flow circuit 17 receives the output of air flow sensor device 15 and, after any necessary formatting, relays the output of air flow sensor device 15 to wireless transmitter 18.

As disclosed herein formatting refers to application of any necessary conversion process to render the output of sensor device 15 suitable for transmission by transmitter 18. For example, output of sensor device 15 may be converted from analog to digital code (i.e. encoded) before transmission by transmitter 18.

Sensor module 10 further includes, preferably, a rechargeable battery 20, which receives power from a charger circuit 22. In the preferred embodiment, charger circuit 22 receives electrical power from a photovoltaic converter 24 and regulates the power so received for the proper charging of rechargeable battery 20. Converter 24 could include one or more photovoltaic device(s) that convert solar energy to electrical energy.

Air pressure sensor 14, air pressure sensor circuit 16, air flow sensor 15, air flow sensor circuit 17 and wireless transmitter 18 receive power from battery 20. Preferably, air pressure sensor 14 and air flow sensor 15 are MEMs-based devices. While not shown, sensor module 10 may be equipped with an ON/OFF switch, which may be used to save battery power, for example, at night when solar device(s) 24 are not receiving solar energy.

Display module 12 includes a wireless receiver 26, which is in wireless communication with wireless transmitter 18 when sensor module 10 and display module 12 are in an ON state. Wireless receiver 26 is in communication with a microprocessor 28 that is programmed to interpret sensor readings (which are based on the output of sensors 14,15) received from transmitter 18 and operates a display device 30 based on the sensor readings so received. Specifically, microprocessor 28 is in communication with a display driver 29, which drives display device 30. Microprocessor 28 operates display driver 29, which in turn operates display device 30.

Display module 12 further includes a rechargeable battery 32, which is charged by a charger circuit 34. Charger circuit 34 may receive power from power supply contacts configured for connection to an external power source, for example, a battery on board the vessel (e.g. a sail boat). Display module 12 may further include an ON/OFF manual switch 36 that can interrupt power to wireless receiver 26, microprocessor 28, display driver 29 and display device 30. Battery 32 supplies power to wireless receiver 26, microprocessor 28, display driver 29 and display device 30 when switch 36 is in its ON state.

Referring now to FIGS. 2A, 2B, 2C, 2D and 2E, a sensor module 10 according to the present invention includes a generally rectangular housing having a top 38 and a base 40. Top 38 includes a port 42 through which battery 20 is accessible. Port 42 is closed off with a top 44, which may be screwed in, or snapped into port 42.

Top 38 includes an opening 39 defined in top 38 through which air pressure sensor 14 is exposed, and another opening 41 defined in top 38 through which air flow sensor 15 is exposed. Converter 24 is arranged on the exterior surface of top 38 and preferably occupies whatever area not occupied by port 42, air pressure sensor 14 and air flow sensor 15. Photovoltaic devices comprising converter 24 are illustrated as rectangular tiles in FIG. 2A.

Figure 2A:
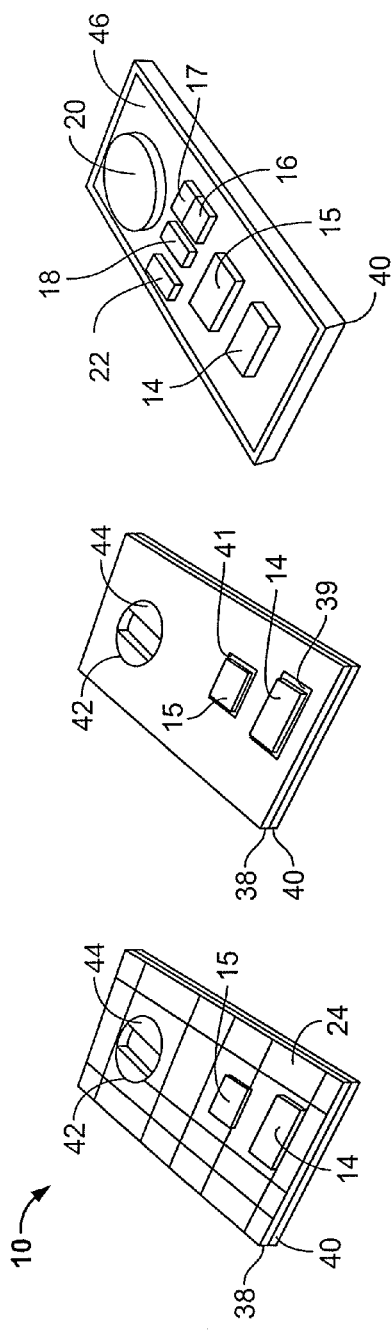
FIG. 2A illustrates a top perspective view of a sensor module in a system according to the present invention.
Figure 2B:
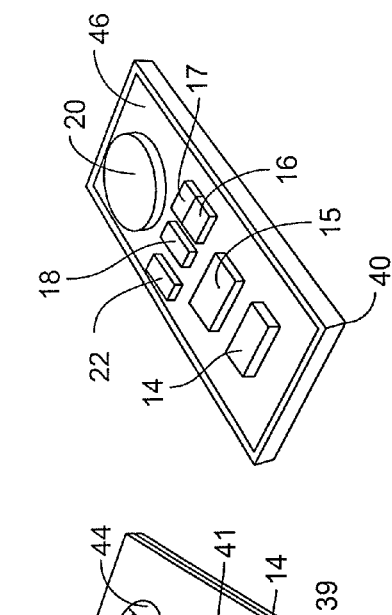
FIG. 2B is a top perspective view of a sensor module of a system according to the present invention with photovoltaic devices removed from the top of its housing.
Figure 2C:
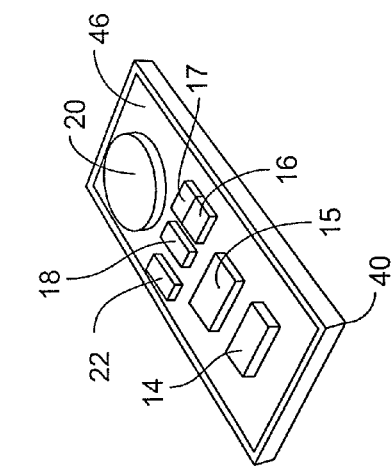
FIG. 2C illustrates a sensor module of a system according to the present invention without a top.
Figure 2D:
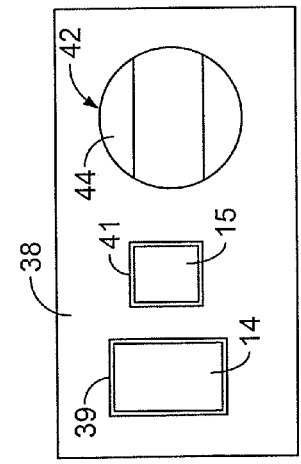
FIG. 2D is a top plan view of a sensor module of a system according to the present invention with photovoltaic devices removed from the top of its housing.
Figure 2E:
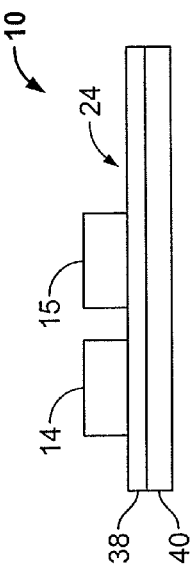
FIG. 2E is a side plan view of a sensor module in a system according to the present invention viewed in the direction of arrow 2E in FIG. 2D.

Referring now to FIG. 2C, which depicts a sensor module 10 without top 38, preferably, a common circuit board 46 supports battery 20, charger circuit 22, wireless transmitter 18, air pressure sensor circuit 16, air pressure sensor device 14, air flow sensor device 15 and air flow sensor circuit 17. Circuit board 46 resides inside base 40 of the housing of sensor module 10. Top 38 is fitted over circuit board 46 and is coupled to base 40 to realize an enclosure in which circuit board 46 is received.

In the preferred embodiment, the output of sensor 14 is formatted by sensor circuits 16, 17 respectively and relayed, via wireless transmitter 18 to wireless receiver 26. Wireless receiver 26 relays the data received from wireless transmitter 18 to microprocessor 26. Microprocessor 26 is programmed to interpret the data received and operates display driver 29, which in turn drives a display device 30 to visually apprise the user of the conditions of wind at the location of sensor module 10. Thus, microprocessor 26 would be programmed to determine air speed and/or air pressure based on sensor readings received from sensor module 10 and programmed to operate display driver 29 to display in human perceptible form air speed and/or air pressure with display device 30.

Referring now to FIGS. 3A and 3B, in a system according to the first embodiment, display module 12 includes a plurality of first visual indicators 48 and second visual indicators 50, which comprise display device 30. Visual indicators 48, 50 may be, for example, digital LCD or LED displays arranged for visual perception on atop surface of the housing of display module 12. Each visual indicator 48 reports the air pressure sensed by a respective sensor module 10 and each visual indicator 50 reports the air flow sensed by a respective sensor module 10 indicative of the speed of air. The air pressure and air speed values are based on the sensor readings received from sensor module 10. Note that microprocessor 28 may be programmed to convert the sensor readings to the appropriate readings to the appropriate units. Thus, visual indicators 48, 50 will be displaying air pressure and air speed with some conventional units for ready comprehension by the user.

FIG. 2A shows a display module 12 with visual indicators 48, 50 for four sensor modules 10, each located at a different location (numbered 1-4 for illustrative purposes).

According to an aspect of the present invention, microprocessor 28, based on data received from a sensor module 10, operates a visual indicator 48 to report the air pressure sensed by that sensor module 10 and operates a visual indicator 50 to report the air flow sensed (speed of air) by that sensor module 10. For example, microprocessor 28 may be programmed to instruct display driver 29 to operate an indicator 48 associated with a particular sensor module 10 (e.g. sensor module corresponding to location) to report that the air pressure sensed by that module is 1.1 atm (at location 1) and to instruct display driver 29 to operate a visual display 50 associated with a particular sensor module 10 to report that air speed is 25 mph (at location 1).

In the preferred embodiment, display module 12 includes a plurality of paired visual indicators 48, 50 each pair for reporting sensor readings of a respective sensor module 10 located on a particular location on the vessel.

Referring to FIG. 3B, in the preferred embodiment, a common circuit board 52 (which resides inside the housing of display module 12) supports and provides the necessary conductive traces for the connection of battery 32 to wireless transmitter 26, microprocessor 28, display driver 29 and display device 30. Furthermore, in the preferred embodiment, circuit board 52 supports power input contacts 54. Power input contacts 54 are connected via appropriate conductive traces on circuit board 52 to charger circuit 34 and are configured to receive power from an external power source (e.g. a battery on board the vessel).

FIG. 3C illustrates two sensor modules 10. Each sensor module 10 is located on a main sail 56 of a sailboat. One sensor module 58 is positioned on the starboard side, and the other sensor module 60 is positioned on the port side opposite the first sensor module. Based on the sensor readings from these two sensor modules a sailor may be able to determine wind conditions at the opposite locations on the sail and make adjustments to the position of the sail to obtain the best pressure differential given the local wind conditions.

Referring to FIG. 3D, in a system according to the second embodiment of the present invention, display module 12 includes visual indicators 48, 50 for sensor module 58 (starboard side) and for sensor module 60 (port side). In this embodiment, a visual indicator 62 (e.g. an LCD or LED display) is provided to report the difference between the pressure sensed by sensor module 58 (starboard side) and sensor module 60 (port side) that are located opposite one another on sail 56, and a visual indicator 64 (e.g. LCD or LED display) is provided to report the difference between air flow sensed by sensor module 58 (starboard side) and sensor module 60 (port side) that are located opposite one another on sail 56. In FIG. 3D AP refers to air pressure and AF refers to air flow (air speed).

In the second embodiment, microprocessor 28 operates indicators 62, 64 to display the differences in air pressure and air flow. For example, microprocessor 28 may operate a pair of visual indicators 62, 64 to report that the difference in pressure sensed by sensor modules 58, 60 is 0.1 atm and the difference in air flow sensed by modules 58, 60 is 3 mph. Based on the information so reported regarding the difference in pressure and/or air speed at local positions a sailor may be able to make adjustments to the orientation of the sail in order to harness the power of the wind more effectively. In FIG. 3D, APD refers to air pressure differentially (differences between pressure readings of two sensor modules, one at a port location the other at a starboard location) and AFD refers to air flow differential (differences between pressure readings, one at a port location and the other at a starboard location) of two sensor modules.

It should be noted that while a sensor module 10 in the preferred embodiment includes an air pressure sensor and an air flow sensor, a skilled person would recognize that it is possible to acquire the local wind conditions using only measurements from one of the sensors.

In the preferred embodiment, a sensor module 10 may include an adhesive body or a clip for mounting to a surface or another body either vertically or horizontally.

Moreover, sensor module 10 and display module 12 may be configured to turn OFF in the event the wind is not blowing to save power.

In addition to sailing, a system according to the present invention may be deployed for acquiring and displaying local wind conditions in other applications such as monitoring air conditions on an aircraft, monitoring air conditions on an object in an air tunnel, or air conditions on a moving car.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A system for collection and reporting of local wind conditions, the system comprising:
   a sensor module that includes at least one sensor device and a transmitter that transmits sensor readings based on output of said sensor device; and
   a display module that reports, in a human perceptible form, wind conditions at location of said sensor module based on said sensor readings, wherein said at least one sensor device is either an air flow sensor or an air pressure sensor, wherein said display module further includes a display device, a display driver and a microprocessor programmed to operate said display driver to display said wind conditions, and wherein said microprocessor is programmed to calculate differences in readings from two different sensor modules each at a different location, and to operate said display driver to drive said display device to display said differences in human perceptible form.

2. The system of claim 1, wherein said at least one sensor device is an air flow sensor and said sensor module further comprising another sensor device, said another sensor device comprising an air pressure sensor.

3. The system of claim 1, further comprising another sensor module that includes at least another sensor device and a transmitter that transmits sensor readings based on output of said another sensor device to said display module, wherein said at least another sensor device is either an air flow sensor or an air pressure sensor, and wherein said display module reports wind conditions, in a human perceptible form, at location of said at least another sensor module based on sensor readings of said at least another sensor module.

4. The system of claim 3, wherein said at least another sensor device is an air flow sensor and said another sensor module further comprising a further sensor device, said further sensor device comprising an air pressure sensor.

5. The system of claim 1, wherein said sensor module includes a housing having a top, said at least on sensor device extending from an interior of said housing to an exterior of said housing through an opening defined in said top.

6. The system of claim 2, wherein said sensor module includes a housing having a top, said at least on sensor device and said another sensor device extending from an interior of said housing to an exterior of said housing each through a respective opening defined in said top.

7. The system of claim 1, wherein said sensor module includes a housing, and further comprising a photovoltaic converter located on a surface of said housing serving as a source of power for said sensor module.

8. The system of claim 1, wherein said transmitter is a wireless transmitter and said display module include a wireless receiver to receive said sensor readings wirelessly from said wireless transmitter.

9. The system of claim 1, wherein said display device of said display module is configured for display of wind conditions at locations of more than one sensor module and said microprocessor is programmed to operate said display driver to display said wind conditions at locations of more than one sensor module.

10. A system for measurement and reporting of local wind conditions, the system comprising:
    a first sensor module that includes at least one sensor device and a transmitter that transmits first sensor readings based on output of said at least one sensor device;
    a second sensor module that includes at least another sensor device and a transmitter that transmits sensor readings based on output of said at least another sensor device; and
    a display module that receives said first sensor readings and said second sensor readings and displays wind conditions at locations of said first and second sensor modules in a human perceptible form, wherein said first sensor module includes a further sensor device, and wherein said at least one sensor device is an air flow sensor and said further sensor device is an air pressure sensor, and wherein said display module includes a display device, a display driver and a microprocessor programmed to operate said display driver to drive said display device to display differences in wind conditions at locations of said first and second sensor modules based on first and second sensor readings.

11. The system of claim 10, wherein said at least one sensor device is either an air flow sensor or an air pressure sensor, said at least another sensor device is either an air flow sensor or an air pressure sensor, and said at least one sensor device and said at least another sensor device measure the same parameter.

12. The system of claim 10, wherein said second sensor module includes an additional sensor device, and wherein said at least another sensor device is an air flow sensor and said additional sensor device is an air pressure sensor.

13. The system of claim 10, wherein said display module includes a display device, a display driver and a microprocessor programmed to operate said display driver to drive said display device to display wind conditions at locations of said first and second sensor modules based on said first and second sensor readings.

14. The system of claim 13, wherein said wind conditions include air speed and air pressure.

15. The system of claim 10, wherein said wind conditions include air speed and air pressure.

* * * * *